(No Model.)
R. MARQUART.
INSERTIBLE DIAMOND SAW TOOTH.
No. 519,475. Patented May 8, 1894.
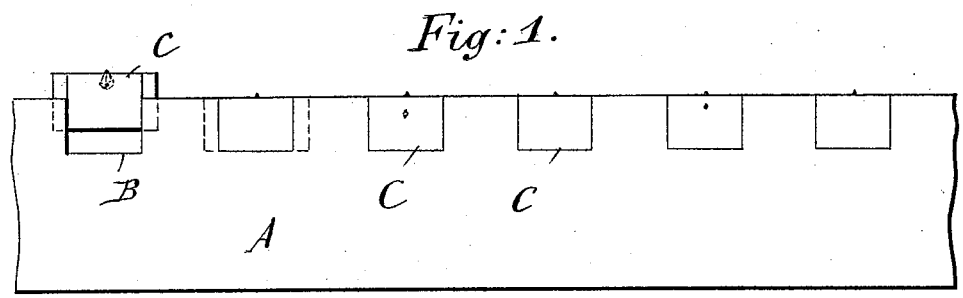
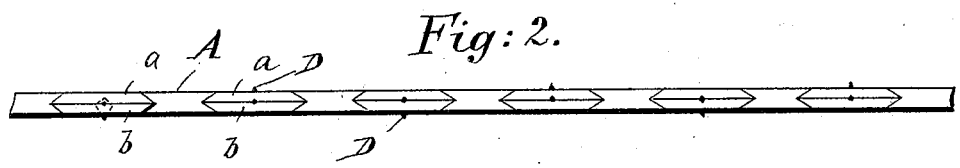
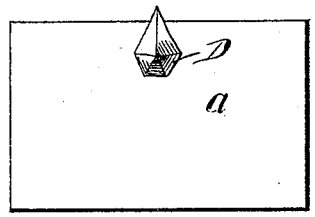
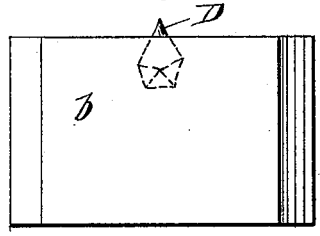
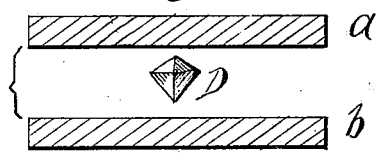
WITNESSES:
K. R. Brennan
Otto Reiss
INVENTOR
R. Marquart
BY Goepel & Raegener
ATTORNEYS.
THE NATIONAL LITHOGRAPHING COMPANY,
WASHINGTON, D. C.

UNITED STATES PATENT OFFICE.

RUDOLF MARQUART, OF NEW YORK, N. Y., ASSIGNOR OF ONE-HALF TO G. SCHNEIDER, OF SAME PLACE, AND L. TISCH, OF HOBOKEN, NEW JERSEY.

INSERTIBLE DIAMOND SAW-TOOTH.

SPECIFICATION forming part of Letters Patent No. 519,475, dated May 8, 1894.

Application filed December 5, 1893. Serial No. 492,838. (No model.)

*To all whom it may concern:*

Be it known that I, RUDOLF MARQUART, a subject of the Emperor of Germany, and a resident of the city, county, and State of New York, have invented certain new and useful Improvements in Insertible Diamond Saw-Teeth, of which the following is a specification.

This invention relates to improvements in the insertible teeth placed in diamond saws that are used for cutting stone; and the object of my invention is to provide a new and improved insertible diamond saw-tooth which is so constructed that the diamond can readily be fastened in the tooth, can easily be examined after having been fastened to ascertain whether it has been injured or not by being fastened, and which tooth can readily be inserted into the saw-blade.

The invention consists in the combination with a saw-blade, having recesses in its edge, the ends of which recesses have V-shaped grooves, of a tooth composed of two plates placed in contact with their flat sides and having their ends beveled to fit the V-shaped grooved ends of the recesses in the saw-blade, and a diamond held between and embedded within the inner surface of said plates.

In the accompanying drawings, Figure 1 is a view of a stone saw blade provided with my improved insertible teeth, one of the teeth being shown raised. Fig. 2 is a plan-view of the blade. Fig. 3 is a view of the inner side of one of the plates and the diamond thereon. Fig. 4 is a horizontal sectional view of the two plates and a diamond between them. Fig. 5 is an exterior side-view of the insertible tooth, and Fig. 6 is a plan-view of the same.

Similar letters of reference indicate corresponding parts.

The saw-blade A is provided in its upper edge with the usual recesses B for the insertible teeth C, which teeth preferably have the end edges tapered or wedge-shaped, and the recesses B have their sides recessed correspondingly to receive said teeth. Each tooth is composed of two plates *a* and *b*, between which the diamond D is held. The diamond can be either a black diamond, such as is usually used for stone-saws or a white or yellow diamond, as may be desired. The two steel plates *a* and *b* are heated to a cherry red heat, that is, until they are soft, the diamond D is placed on one of the plates *a* near the upper edge of the same, so that one of the points of the diamond projects slightly beyond or up to the top edge of the plate and then the other plate, which is also heated to a cherry red heat, is placed carefully upon the first plate, so as to fully cover the same. By means of a press the two plates are then pressed firmly together until their inner surfaces are in contact. As both plates are heated uniformly, the diamond will be pressed into both plates and will form a cavity in each, in which cavities the diamond rests. The diamond is thus held firmly and securely as long as the two plates are in contact. After the diamond has thus been embedded the upper plate is lifted off, which permits of removing the diamond from the cavity in the lower plate and carefully examining it to see whether it has been fractured or otherwise injured by the operation of fitting and inserting it. If it is found that the diamond has remained intact, it is replaced, the two plates are placed together again and carefully united at the ends by hard or soft solder, so as to form an entirety. The tooth thus produced is then filed off at the top edge or sides until the points of the diamond project as much as desired either at the top edge or one side or both the top edge and side, and then the tooth is inserted into one of the recesses *b* of the saw and driven home. If desired, the soldering of the two plates can be dispensed with and the two plates with the diamond held between them can be inserted in the cavities of the saw-blade and driven home, the plates being held together and the diamond being held between them by dove-tails on the ends of the plates and the sides of the recesses in the blade. The diamonds are held firmly and securely in my improved insertible teeth and are not subjected to injury or fracture as they are when fastened by means of clamps, which are forcibly driven against the diamonds. One or more diamonds can be held in each saw as may be desired.

Having thus described my invention, I claim as new and desire to secure by Letters Patent—

The combination, with a saw-blade provided with recesses in its edge, the ends of which recesses are grooved V-shape, of a saw-tooth composed of two plates having their flat sides in contact, which plates both are of a height equal to the depth of the recess in the blade and extend the entire length of the recess, the ends of the plate being beveled to fit the V-shaped grooves in the ends of the recesses of the blade and a diamond held between and embedded in the inner surfaces of said plates, substantially as set forth.

In testimony that I claim the foregoing as my invention I have signed my name in presence of two subscribing witnesses.

RUDOLF MARQUART.

Witnesses:
OSCAR F. GUNZ,
K. R. BRENNAN.